US010105903B2

(12) United States Patent
Levy et al.

(10) Patent No.: US 10,105,903 B2
(45) Date of Patent: Oct. 23, 2018

(54) SYSTEM AND METHOD FOR ADDITIVE MANUFACTURING OF AN OBJECT

(75) Inventors: Avraham Levy, Petach-Tikva (IL); Keren Regev, Tel-Aviv (IL); Claudio Rottman, Modi'in (IL); Shai Hirsch, Rechovot (IL)

(73) Assignee: Stratasys Ltd., Rehovot (IL)

( * ) Notice: Subject to any disclaimer, the term of this patent is extended or adjusted under 35 U.S.C. 154(b) by 683 days.

(21) Appl. No.: 13/989,826

(22) PCT Filed: Nov. 28, 2011

(86) PCT No.: PCT/IL2011/050032
§ 371 (c)(1),
(2), (4) Date: May 28, 2013

(87) PCT Pub. No.: WO2012/070053
PCT Pub. Date: May 31, 2012

(65) Prior Publication Data
US 2014/0110872 A1 Apr. 24, 2014

Related U.S. Application Data

(60) Provisional application No. 61/417,438, filed on Nov. 28, 2010.

(51) Int. Cl.
*B29C 64/112* (2017.01)
*B33Y 10/00* (2015.01)
(Continued)

(52) U.S. Cl.
CPC ........ *B29C 67/0088* (2013.01); *B29C 64/112* (2017.08); *B29C 64/40* (2017.08);
(Continued)

(58) Field of Classification Search
None
See application file for complete search history.

(56) References Cited

U.S. PATENT DOCUMENTS 5,184,307 A * 2/1993 Hull .................. G01J 1/4257
156/273.3
5,965,079 A * 10/1999 Manners ............ B29C 67/0066
264/308
(Continued)

FOREIGN PATENT DOCUMENTS

JP 2003-062914 3/2003
JP 2008-189782 8/2008
(Continued)

OTHER PUBLICATIONS

International Search Report and the Written Opinion dated Apr. 24, 2012 From the International Searching Authority Re. Application No. PCT/IL2011/050032.
(Continued)

*Primary Examiner* — Jeffrey Wollschlager
*Assistant Examiner* — Armand Melendez

(57) ABSTRACT

The method comprises sequentially forming a plurality of layers in a configured pattern corresponding to the shape of the object, thereby forming the object. The formation of each layer comprises dispensing at least one uncured building material, and at least partially curing the uncured building material, wherein for at least one layer, the curing is initiated at least t seconds after commencement of curing of a layer immediately preceding that layer. The t parameter is longer than the number of seconds required for the formation of the layer.

23 Claims, 4 Drawing Sheets

(51) Int. Cl.
*B33Y 30/00* (2015.01)
*B33Y 50/02* (2015.01)
*B29C 67/00* (2017.01)
*B29C 64/40* (2017.01)

(52) U.S. Cl.
CPC .......... *B29C 67/0062* (2013.01); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 6,399,010 | B1* | 6/2002 | Guertin | G05B 19/4099 264/308 |
| 2002/0188369 | A1* | 12/2002 | Guertin | B29C 67/0092 700/119 |
| 2003/0001312 | A1* | 1/2003 | Nguyen | B29C 67/0092 264/401 |
| 2004/0187714 | A1* | 9/2004 | Napadensky | B29C 41/48 101/35 |
| 2006/0054039 | A1* | 3/2006 | Kritchman | B29C 41/02 101/424.1 |

FOREIGN PATENT DOCUMENTS

| | | |
|---|---|---|
| WO | WO 2004/050323 | 6/2004 |
| WO | WO 2012/070053 | 5/2012 |

OTHER PUBLICATIONS

Notification of Office Action dated Feb. 2, 2015 From the State Intellectual Property Office of the People's Republic of China Re. Application No. 201180057147.9.
Translation Dated Mar. 11, 2015 of Notification of Office Action dated Feb. 2, 2015 From the State Intellectual Property Office of the People's Republic of China Re. Application No. 201180057147.9.
Invitation Pursuant to Rule 137(4) EPC Dated Apr. 22, 2015 From the European Patent Office Re. Application No. 11808366.6.
International Preliminary Report on Patentability dated Jun. 6, 2013 From the International Bureau of WIPO Re. Application No. PCT/IL2011/050032.
Notification of Decision of Rejection dated May 4, 2016 From the State Intellectual Property Office of the People's Republic of China Re. Application No. 201180057147.9.
Office Action dated Jun. 19, 2016 From the Israel Patent Office Re. Application No. 226623 and Its Translation Into English.
Translation of Notification of Decision of Rejection dated May 4, 2016 From the State Intellectual Property Office of the People's Republic of China Re. Application No. 201180057147.9.
European Search Report and the European Search Opinion dated May 20, 2016 From the European Patent Office Re. Application No. 16155427.4.
Notice of Reasons for Rejection dated Sep. 15, 2015 From the Japanese Patent Office Re. Application No. 2013-540490 and Its Translation Into English.
Notification of Office Action dated Sep. 6, 2015 From the State Intellectual Property Office of the People's Republic of China Re. Application No. 201180057147.9 and Its Translation Into English.
Office Action dated Nov. 7, 2017 From the Israel Patent Office Re. Application No. 247758 and Its Translation Into English. (11 Pages).
Notification of Office Action dated Jun. 5, 2018 From the State Intellectual Property Office of the People's Republic of China Re. Application No. 201610633309.3. (8 Pages).
Translation dated Jul. 24, 2018 of Notification of Office Action dated Jun. 5, 2018 From the State Intellectual Property Office of the People's Republic of China Re. Application No. 201610633309.3. (12 Pages).

* cited by examiner

SYSTEM AND METHOD FOR ADDITIVE MANUFACTURING OF AN OBJECT

RELATED APPLICATIONS

This application is a National Phase of PCT Patent Application No. PCT/IL2011/050032 having International filing date of Nov. 28, 2011, which claims the benefit of priority under 35 USC § 119(e) of U.S. Provisional Patent Application No. 61/417,438 filed on Nov. 28, 2010. The contents of the above applications are all incorporated by reference as if fully set forth herein in their entirety.

FIELD AND BACKGROUND OF THE INVENTION

The present invention, in some embodiments thereof, relates to Additive Manufacturing (AM) of an object, more particularly, but not exclusively, to a system and method for additive manufacturing of an object while reducing object curling effects.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Additive manufacturing entails many different approaches to the method of fabrication, including three-dimensional printing, laminated object manufacturing, fused deposition modeling and others.

In three-dimensional printing processes, for example, a building material is dispensed from a dispensing head having a set of nozzles to deposit layers on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335 7,209,797, 7,225,045, 7,300,619, 7,479,510, 7,500,846, 7,658,976, and 7,962,237, and U.S. Published Applications No. 20100191360, all of the same Assignee, the contents of which are hereby incorporated by reference.

AM facilitates rapid fabrication of functioning prototypes with minimal investment in tooling and labor. Such rapid prototyping shortens the product development cycle and improves the design process by providing rapid and effective feedback to the designer. AM can also be used for rapid fabrication of non-functional parts, e.g., for the purpose of assessing various aspects of a design such as aesthetics, fit, assembly and the like. Additionally, AM techniques have been proven to be useful in the fields of medicine, where expected outcomes are modeled prior to performing procedures. It is recognized that many other areas can benefit from rapid prototyping technology, including, without limitation, the fields of architecture, dentistry and plastic surgery where the visualization of a particular design and/or function is useful.

Several AM techniques allow additive formation of objects using more than one modeling material. For example, U.S. Published Application No. 20100191360 of the present Assignee, the contents of which are hereby incorporated by reference, discloses a system which comprises an additive manufacturing apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

SUMMARY OF THE INVENTION

According to an aspect of some embodiments of the present invention there is provided a method of additive manufacturing of a three-dimensional object. The method comprises sequentially forming a plurality of layers in a configured pattern corresponding to the shape of the object, thereby forming the object. The formation of each layer comprises dispensing at least one uncured building material, and at least partially curing the uncured building material. For at least one of the layers, the curing is initiated at least t seconds after commencement of curing of a layer immediately preceding the at least one layer. The t parameter is larger than the number of seconds required for the formation of the layer.

According to some embodiments of the invention the method comprises receiving characteristic heat deflection temperature (HDT) data of the at least one building material, and selecting a value of the t responsively to the HDT.

According to some embodiments of the invention the method comprises selecting a value of the t based on a type of the at least one building material.

According to some embodiments of the invention the method comprises selecting a value of the t based on energy dose per unit volume delivered to the at least one layer during the curing.

According to some embodiments of the invention the method comprises selecting a value of the t based a thickness of the at least one layer.

According to some embodiments of the invention the method comprises selecting a value of the t based a rate characterizing the dispensing of the at least one layer.

According to some embodiments of the invention a characteristic heat deflection temperature (HDT) of the at least one building material post curing is higher than a temperature of the layers while being formed.

According to some embodiments of the invention the characteristic HDT is at least 50° C.

According to some embodiments of the invention the building material comprises at least 30% by weight of a mono acrylic or mono methacrylic functional monomer, and a respective polymer of the monomer has a glass transition temperature (Tg) higher than 50° C. According to some embodiments of the invention the Tg is higher than 60° C. According to some embodiments of the invention the Tg is higher than 70° C.

According to an aspect of some embodiments of the present invention there is provided a computer software product, comprising a computer-readable medium in which program instructions are stored, which instructions, when read by a computerized controller of an additive manufacturing system, cause the system to execute the method described herein.

According to an aspect of some embodiments of the present invention there is provided a system for additive manufacturing of a three-dimensional object. The system comprises: a dispensing unit configured for dispensing at least one type of uncured building material; a curing unit configured for curing the uncured building material; and a controller configured for operating the dispensing unit and the curing unit to sequentially form a plurality of layers in a configured pattern corresponding to the shape of the three-dimensional object, such that for at least one layer of the layers, the curing is initiated at least t seconds after commencement of curing of a layer immediately preceding the at least one layer. The t parameter is larger than the number of seconds required for the formation of the layer.

According to some embodiments of the invention t is at least 6.

According to some embodiments of the invention t is from about 10 seconds to about 25 seconds.

According to some embodiments of the invention the controller is configured to receive characteristic heat deflection temperature (HDT) data of the at least one building material, and to select a value of the t responsively to the HDT.

According to some embodiments of the invention the controller is configured to select a value of the t based on a type of the at least one building material.

According to some embodiments of the invention the controller is configured to select a value of the t based on energy dose per unit volume delivered to the at least one layer during the curing.

According to some embodiments of the invention the controller is configured to select a value of the t based a thickness of the at least one layer.

According to some embodiments of the invention the controller is configured to select a value of the t based a rate characterizing the dispensing of the at least one layer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
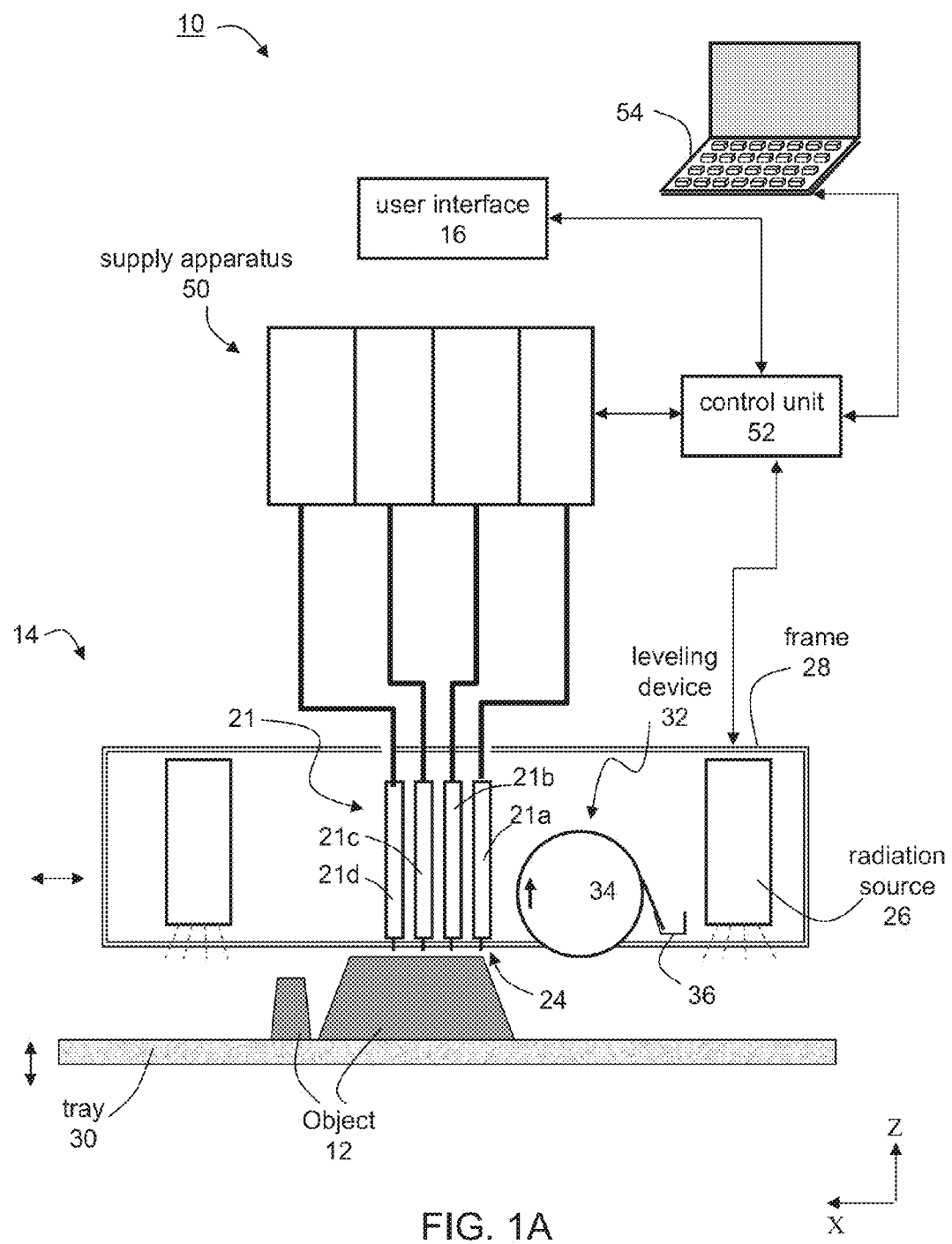
FIGS. 1A and 1B are schematic illustration of an additive manufacturing system according to some embodiments of the present invention.

The present invention, in some embodiments thereof, relates to Additive Manufacturing (AM) of an object, more particularly, but not exclusively, to a system and method for additive manufacturing of an object while reducing curling effects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects in a layer wise manner by forming a plurality of layers in a configured pattern corresponding to the shape of the objects.

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In some embodiments of the present invention the AM comprises three-dimensional printing. In these embodiments a building material is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in Additive manufacturing and which is able to form a three-dimensional object on its own, i.e., without having to be mixed or combined with any other substance.

The final three-dimensional object is made of the modeling material or a combination of modeling and support material or modification thereof (e.g., following curing). All these operations are well-known to those skilled in the art of solid freeform fabrication.

In some exemplary embodiments of the invention an object is manufactured by dispensing two or more different modeling materials, each material from a different dispensing head of the AM. The materials are optionally and preferably deposited in layers during the same pass of the printing heads. The materials and combination of materials within the layer are selected according to the desired properties of the object.

Figure 1B:
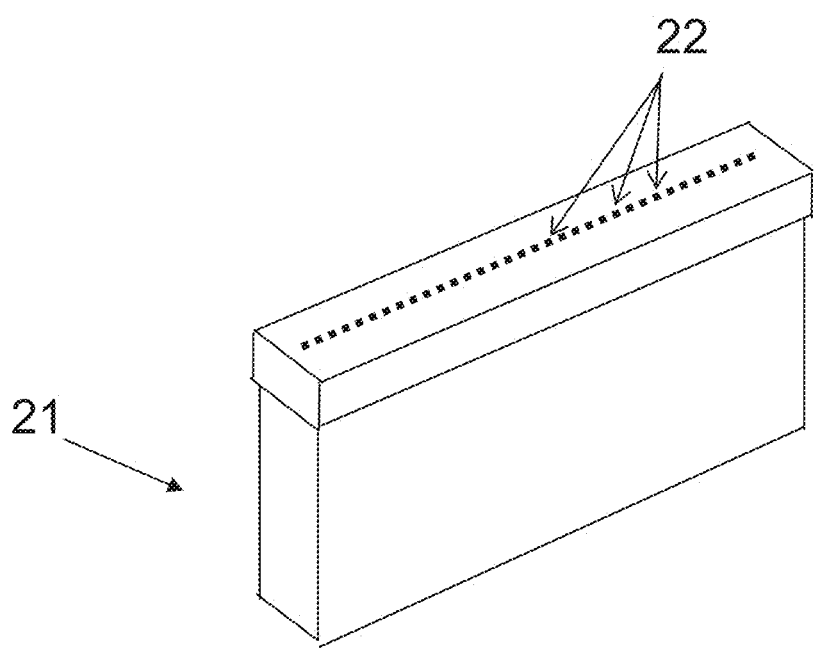

A representative and non-limiting example of a system 10 suitable for AM of an object 12 according to some embodiments of the present invention is illustrated in FIGS. 1A-B. System 10 comprises an additive manufacturing apparatus 14 having a dispensing unit 21 which comprises a plurality of dispensing heads. Each head preferably comprises an array of one or more nozzles 22, as illustrated in FIG. 1B, through which a liquid building material 24 is dispensed.

Preferably, but not obligatorily, apparatus 14 is a three-dimensional printing apparatus, in which case the dispensing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, binder jet powder based apparatus, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 21a, 21b, 21c and 21d are illustrated. Each of heads 21a, 21b, 21c and 21d has a nozzle array. In this Example, heads 21a and 21b can be designated for modeling material/s and heads 21c and 21d can be designated for support material. Thus, head 21a can dispense a first modeling material, head 21b can dispense a second modeling material and heads 21c and 21d can both dispense support material. In an alternative embodiment, heads 21c and 21d, for example, may be combined in a single head having two nozzle arrays for depositing support material.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein the term "about" refers to ±10%.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 14 can further comprise a curing unit which can comprise one or more radiation sources 26, which can be, for example, an ultraviolet or visible or infrared lamp, or other sources of electromagnetic radiation, or electron beam source, depending on the modeling material being used. Radiation source 26 serves for curing or solidifying the modeling material.

The dispensing head and radiation source are preferably mounted in a frame or block 28 which is preferably operative to reciprocally move over a tray 30, which serves as the working surface. In some embodiments of the present invention the radiation sources are mounted in the block such that they follow in the wake of the dispensing heads to at least partially cure or solidify the materials just dispensed by the dispensing heads. According to the common conventions, tray 30 is positioned in the X-Y plane. Tray 30 is preferably configured to move vertically (along the Z direction), typically downward. In various exemplary embodiments of the invention, apparatus 14 further comprises one or more leveling devices 32, e.g. a roller 34. Leveling device 32 serves to straighten, level and/or establish a thickness of the newly formed layer prior to the formation of the successive layer thereon. Leveling device 32 preferably comprises a waste collection device 36 for collecting the excess material generated during leveling. Waste collection device 36 may comprise any mechanism that delivers the material to a waste tank or waste cartridge.

In use, the dispensing heads of unit 21 move in a scanning direction, which is referred to herein as the X direction, and selectively dispense building material in a predetermined configuration in the course of their passage over tray 30. The building material typically comprises one or more types of support material and one or more types of modeling material. The passage of the dispensing heads of unit 21 is followed by the curing of the modeling material(s) by radiation source 26. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 32, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 30 is lowered in the Z direction to a predetermined Z level, according to the desired thickness of the layer subsequently to be printed. The procedure is repeated to form three-dimensional object 12 in a layerwise manner.

In another embodiment, tray 30 may be displaced in the Z direction between forward and reverse passages of the dispensing head of unit 21, within the layer. Such Z displacement is carried out in order to cause contact of the leveling device with the surface in one direction and prevent contact in the other direction.

System 10 optionally and preferably comprises a building material supply apparatus 50 which comprises the building material containers or cartridges and supplies a plurality of building materials to fabrication apparatus 14.

A control unit 52 controls fabrication apparatus 14 and optionally and preferably also supply apparatus 50. Control unit 52 preferably communicates with a data processor 54 which transmits digital data pertaining to fabrication instructions based on computer object data, e.g., a CAD configuration represented on a computer readable medium in a form of a Standard Tessellation Language (STL) format or the like. Typically, control unit 52 controls the voltage applied to each dispensing head or nozzle array and the temperature of the building material in the respective printing head.

Once the manufacturing data is loaded to control unit 52 it can operate without user intervention. In some embodiments, control unit 52 receives additional input from the operator, e.g., using data processor 54 or using a user interface 16 communicating with unit 52. User interface 16 can be of any type known in the art, such as, but not limited to, a keyboard, a touch screen and the like. For example, control unit 52 can receive, as additional input, one or more building material types and/or attributes, such as, but not limited to, color, characteristic distortion and/or transition temperature, viscosity, electrical property, magnetic property. Other attributes and groups of attributes are also contemplated.

Some embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system such as system 10 is found in U.S. Published Application No. 20100191360, the contents of which are hereby incorporated by reference.

Even though AM is widely practiced and has become a routine procedure for fabricating arbitrarily shaped structures throughout the world, the present Inventor found that it is not without certain operative limitations. For example, it was found by the present inventors that some modeling materials, particularly UV polymerizable materials, exhibit undesired deformation such as curling during the fabrication of the object. Such curling tendency was found to be the result of material shrinkage during phase transition from liquid to solid.

The extent of curling is a measurable quantity. A suitable process for measuring the extent of curling can include fabrication of an object of a predetermined shape, e.g., an elongated bar having a rectangular or square cross section, on a flat and horizontal surface, applying a predetermined load on one end of the object, and measuring the elevation of the opposite end above the surface.

In a search made by the inventors of the present invention for a solution to the problem of curling, it was found that the extent of curling is proportional to the extent of volumetric shrinkage that the material undergoes during the polymerization process and the temperature difference between the Heat Distortion Temperature (HDT) of the material and the temperature within the system during fabrication. The present inventors found that the curling is particularly noticeable for materials with relatively high volumetric shrinkage and relatively high HDT (e.g., within the range of the polymerization temperature). The present inventors further found that there is a monotonic relation between the HDT and tendency for curling. Without wishing to be bound to any theory, it is postulated that materials that develop during curing HDT which is close to the temperature within the system during fabrication can undergo stress relaxation or plastic deformation during the AM process, more easily than materials with similar shrinkage but which develop higher HDT.

As used herein, the term "heat distortion temperature" (HDT) refers to a temperature at which the respective material or combination of materials deforms under a predetermined load at some certain temperature. Suitable test procedures for determining the HDT of a material or combination of materials are the ASTM D-648 series, particularly the ASTM D-648-06 and ASTM D-648-07 methods.

For example, in PolyJet™ systems, marketed by Objet Ltd., Israel, formulations which upon UV irradiation produce a cross-linked polymer material are used. Objects manufactured with these materials have relatively high rigidity with HDT higher than room temperature, e.g., about 50° C. or higher. Such elevated HDT values was found to provide low dimensional accuracy (high curling effect). Thus, it was discovered that high HDT and low curling are conflicting properties. The present inventors have conducted an experimental research, inter alia, for the purpose of providing a technique for the additive manufacturing of a three-dimensional object which enjoys both high dimensional accuracy (low curling effect) and high HDT immediately after the manufacturing is complete.

It was found by the present inventors, that the existence of curling effect or lack thereof depends on the elapsed time between curing of successive layers. Specifically, it was found that the curling effect of the final object can be reduced or eliminated by setting a sufficiently prolonged time interval between the initiations of curing of successive layers.

In various exemplary embodiments of the invention control unit 52 is configured for operating dispensing unit 21 and curing unit 26 such that for at least one, or at least two, or at least three of the layers forming the object, e.g., most or all the layers, the curing of the respective layer is initiated at least t seconds after commencement of curing of a layer immediately preceding that respective layer. Typically, but not necessarily, the respective layer has a thickness which is about 15 microns. In some embodiments, the respective layer has a thickness of at least 5 microns, e.g., about 5 microns, or about 10 microns, or about 15 microns or about 30 microns. Other thicknesses are not excluded from the scope of the present invention.

In various exemplary embodiments of the invention t is longer than the overall time in which a single layer is formed, including the dispensing and curing times taken in aggregate. For example, when the overall formation time of a given layer is 5 seconds, t is longer than 5. The difference between the overall formation time and t is defined as the "delay". Thus, unlike conventional systems in which each layer is deposited and cured immediately following the curing of the previous layer, control unit 52 delays the deposition and/or curing of the layer until the elapsed time from the initiation of the curing of the immediate previous layer is t or more seconds.

A representative example for a delay protocol, which is not to be considered as limiting the scope of the present invention, is as follows: control unit 52 signals block 28 to move one pass over tray 30 to dispense and cure a single layer of building material. Thereafter, control unit 52 set block 28 to rest at a resting position, e.g., at or near the end of tray 30 or outside tray 30, for a resting time-period, i.e. a delay, which equals one or more such passes (e.g., 2 or 3 passes). Following the resting period, control unit 52 signals block 28 to initiate another pass for dispensing and curing the subsequent layer.

Typical values for t include, without limitation, at least 6, or at least 7, or at least 8, or at least 9, or at least 10. In some embodiments of the present invention t is at most 25. In some embodiments of the invention, t is less than 6.

The value of t can also depend on the properties of the respective materials used for manufacturing the object and optionally also on the temperature at which the object is being manufactured.

In some embodiments of the present invention control unit 52 receives HDT data which characterize the building material being used. The HDT data typically corresponds to the HDT that the material acquires once cured. Such data can be provided, for example, by the operator by means of data processor 54 or user interface 16. It is to be understood that it is not necessary for the operator to literally enter the HDT data (although this is also contemplated). In some embodiments of the present invention control unit 52 or data processor 54 access a database of HDT values which can be stored in a memory medium (not shown) and select the HDT value based on other types of input made by the operator. For example, such a database can include a plurality of entries each having a building material type and a corresponding HDT value. In these embodiments, the operator can enter the type of building material or select it from a list of options, and control unit 52 or data processor 54 obtains the respective HDT value from the database. Also contemplated are embodiments in which the control unit 52 or data processor 54 obtains the respective HDT value from the database based on the type(s) of building materials loaded into supply apparatus 50.

Once control unit 52 receives the HDT data it optionally selects the value of t responsively to the HDT. This can be done in more than one way. In some embodiments, a lookup table is used. Such a lookup table can be stored in a memory medium accessible by unit 52. The lookup table can include a plurality of entries each having an HDT value and a corresponding t value. Control unit 52 can search the table for an entry that best matches the received HDT value and select the respective t value or approximate the t value based on the best matched entry or entries. In some embodiments, control unit 52 can employ a preprogrammed function t(HDT) for determining the value of t for a given value of HDT. Such function is preferably a monotonically increasing function (e.g., a linear function having a positive slope) of HDT. Preferably, the returned value of the function for HDT=50° C. is at least 6.

It is to be understood that it is not necessary for control unit 52 to select the value of t based the value of HDT. In some embodiments of the present invention control unit 52 selects the value of t directly from the type of building material being used for manufacturing the object. This is typically performed by a lookup table which in some embodiments of the present invention is stored in a memory medium accessible by unit 52. Such a lookup table can include a plurality of entries each having a building material type or a building material family type and a corresponding t value. Control unit 52 can search the table for an entry that best matches the type of building material or the family type of the building material, and select the respective t value.

Also contemplated are embodiments in which the value of t is also based on the operational temperature of the manufacturing process, preferably, but not necessarily, on the difference between the HDT value and the operational temperature.

The value of t can optionally and preferably be based, at least in part on the energy dose delivered to the most recently formed layer. The energy dose per unit volume depends, in principle, on the intensity of the radiation emitted by curing unit 26, and on the rate at which the material is dispensed.

The dispensing rate, in turn, depends on the speed of block 28 along the X direction and on the flow of building material out of nozzles 22. For example, for a given modeling material, a given flow of building material out of nozzles 22 and a given radiation intensity, the speed of block 28 moving along the X direction results in a lower polymerization extent per layer in the formation process, with the layers continuing to polymerize during the curing of subsequent layers above them. It was found by the present inventors that such polymerization of previously formed layers increases the curling effect.

Thus, in various exemplary embodiments of the invention the value of t is calculated based on one or more of the following parameters: (i) layer thickness, (ii) dispensing rate, (iii) radiation intensity, (iv) polymerization rate per unit energy dose, and (v) the HDT of the material being cured. In some embodiments, the value of t is calculated based on at least two of the above parameters, in some embodiments of the present invention the value of t is calculated based on at least three of the above parameters, and in some embodiments of the present invention the value of t is calculated based on all the above parameters.

In an aspect of some embodiments of the present invention there is provided a method suitable for additive manufacturing of a three-dimensional object. The method can be executed using an AM system, e.g., system 10. The method comprises sequentially forming a plurality of layers in a configured pattern corresponding to the shape of the object. The formation of each layer comprises dispensing of at least one building material to form an uncured layer, and at least partially curing of the uncured layer. For one or more of the layers, the curing is initiated at least t seconds after the commencement of the curing of a layer immediately preceding the respective layer as further detailed hereinabove. In some embodiments of the present invention the method receives characteristic HDT data of at least one of the building materials, and selects a value of t responsively to HDT, as further detailed hereinabove. In some embodiments, the value of t is selected based on the HDT of the building material.

The method and system of the present embodiments can utilize many types of building materials. Representative examples include, without limitation, building materials for which the post curing HDT at a pressure of about 0.45 MPa, as measured by one or more of the ASTM D-648 series of procedures, particularly the ASTM D-648-06 and ASTM D-648-07 methods, and optionally both the ASTM D-648-06 and ASTM D-648-07 methods, is higher than the temperature of layers while being formed, preferably HDT about 50° C. or higher.

Suitable building materials can include compositions which comprise acrylic or methacrylic functionalities, which are UV polymerizable by radical mechanism, e.g., the addition reaction of acrylic functional groups. Further examples include, without limitation, UV polymerizable compositions that comprise at least 30% by weight of a mono acrylic or mono methacrylic functional monomer, wherein the respective polymer of the monomer has a Glass Transition Temperature (Tg) higher than about 50° C. In some embodiment, Tg is higher than 60° C. or higher than 70° C.

Herein, "Tg" refers to glass transition temperature defined as the location of the local maximum of the E" curve, where E" is the loss modulus of the material as a function of the temperature.

Some representative types of materials suitable for the present embodiments include Objet® VeroBlue RGD840, Objet® VeroGrey RGD850, Objet® VeroBlack RGD870 and Objet® RGD525 which are commercially available modeling materials of Objet Ltd.

One or more of the operations of the method of the present embodiments is implemented by a computer. Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The computer implemented method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

It is expected that during the life of a patent maturing from this application many relevant modeling materials for AM will be developed and the scope of the term modeling material is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Experiments were performed to study the relation between the time delay of the curing process and the curling effect. The study was directed to determine the minimal time delay between successive layers for maximal deformation reduction.

The Experiments were performed using Connex 500 (Objet Ltd., Israel). The system was operated in High Quality operation mode.

In each experiment, four elongated bars having a square cross-section 10×10 mm$^2$ were printed on a horizontal tray. Two bars were 250 mm in length and two bars were 350 mm in length. Objet® RGD525 is an exemplary modeling material used to print the rods.

The following time delays (in seconds) between successive curing processes were employed: 0, 5, 8, 10, 12, 13, 14, 15, 17, 20 and 25. These time values indicate durations for which the printing head was waiting before the next layer was deposited and cured.

The curling was measured using a load e.g. of 300 gr weight on one side of the bar (on the horizontal surface), and on the other side measuring the vertical distance of the bar from the horizontal surface. The deformation was measured 24-48 hours after printing. The total printing time was measured. A time factor was calculated with respect to a reference printing process in which the printing head moves 1 pass per layer without delay between successive layers (first entry in Table 2, below).

Figure 2A:
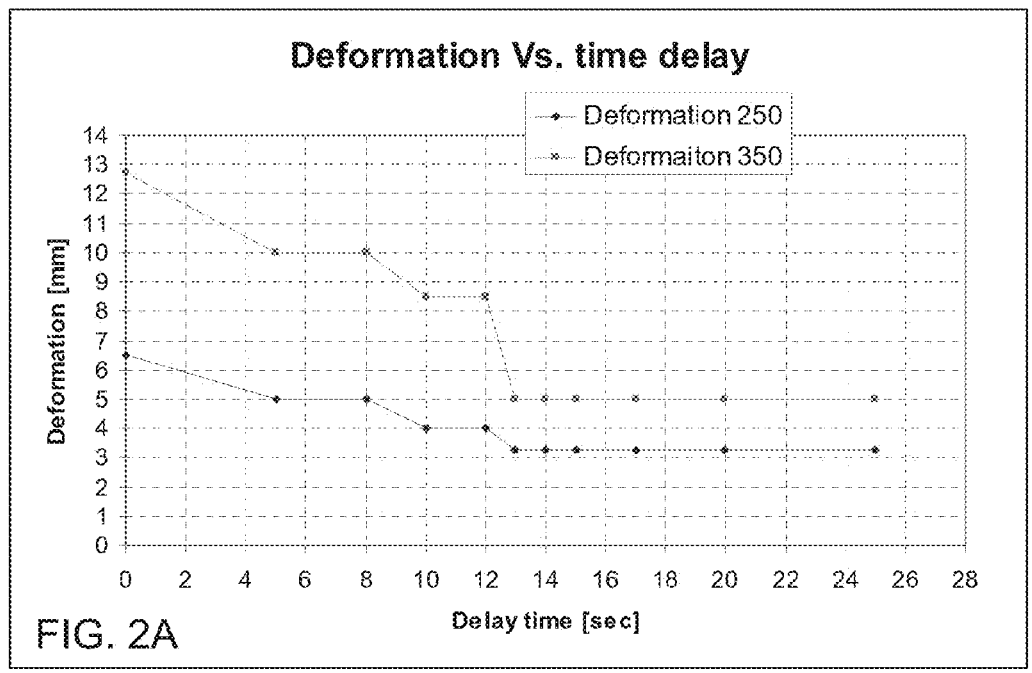
FIGS. 2A and 2B show deformation extents for bars having lengths of 250 mm and 350 mm, as obtained during experiments performed according to some embodiments of the present invention.
Figure 2B:
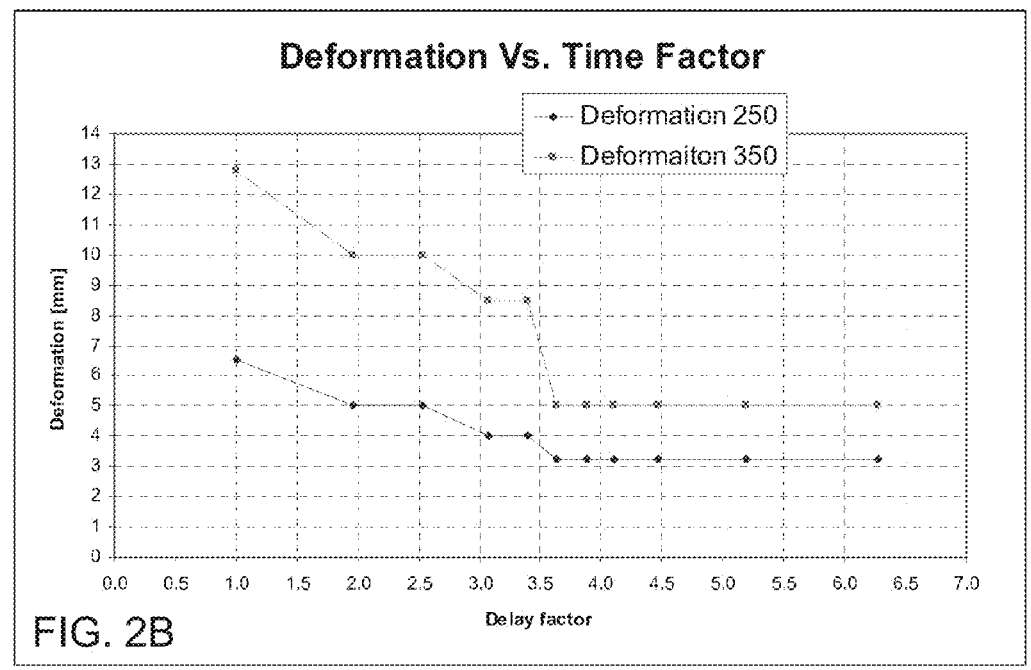

The results are summarized in Table 1 and FIGS. 2A and 2B. For each delay time entry in Table 1, the respective deformation is the average of the results obtained for the two bars. The maximal deformation variations was 0.5 mm. The printing times are averages of four bars.

TABLE 1

| Delay time [seconds] | Average Deformation [mm] (250 mm bar) | Average Deformation [mm] (350 mm bar) | Total printing time [hrs] | Time factor |
|---|---|---|---|---|
| 0 | 6.5 | 12.8 | 0:58 | 1.0 |
| 5 | 5 | 10.0 | 1:54 | 2.0 |
| 8 | 5 | 10.0 | 2:27 | 2.5 |
| 10 | 4 | 8.5 | 2:58 | 3.1 |
| 12 | 4 | 8.5 | 3:17 | 3.4 |
| 13 | 3.25 | 5.0 | 3:31 | 3.6 |
| 14 | 3.25 | 5.0 | 3:45 | 3.9 |
| 15 | 3.25 | 5.0 | 3:58 | 4.1 |
| 17 | 3.25 | 5.0 | 4:19 | 4.5 |
| 20 | 3.25 | 5.0 | 5:01 | 5.2 |
| 25 | 3.25 | 5.0 | 6:04 | 6.3 |

Table 1 and FIGS. 2A-B demonstrate that employing a delay time between successive layer formations significantly reduces the curling effect. In the present example, the minimal delay time for achieving maximal reduction was 13 seconds which prolonged the overall printing time by a factor of about 3.6.

Example 2

The experiments in this example were similar to those described in Example 1, but using the bar length of 230 mm, where the printing system was first operated in high printing speed mode (HS) and then in high quality (HQ) mode. High printing speed mode refers to the length of time to complete the printing of the object being shorter, i.e. 'speedier' than in a normal mode. High quality mode refers to a higher printing resolution of the object.

Figure 3:
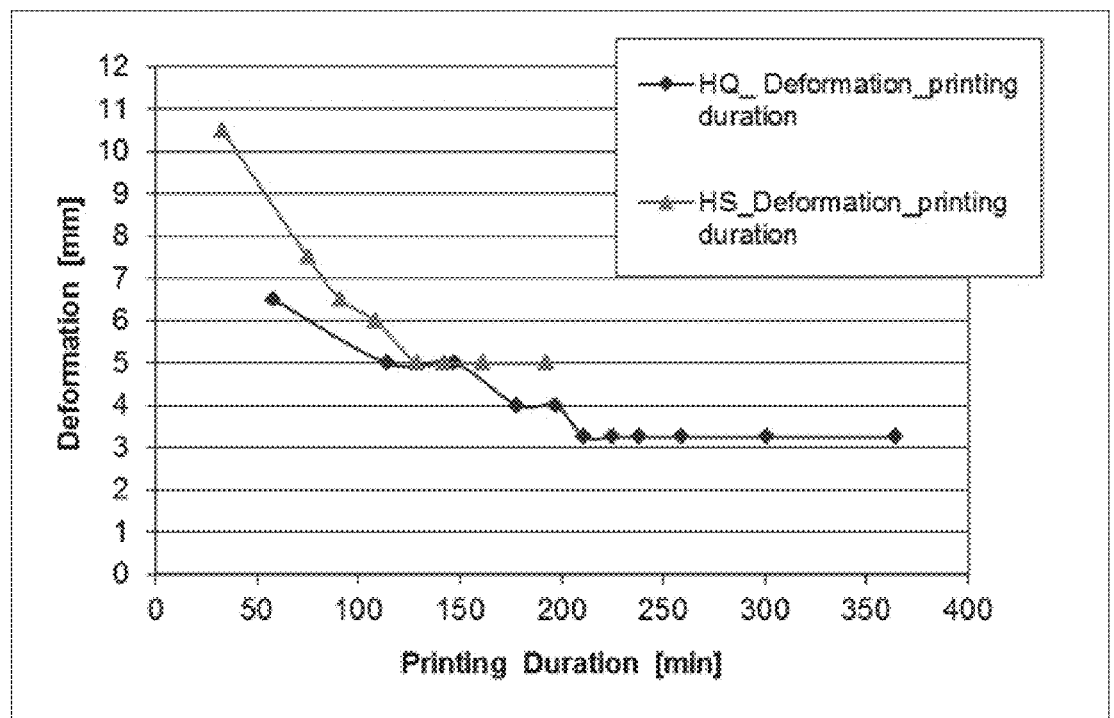
FIG. 3 shows deformation extents for bars having lengths of 230 mm, as obtained during experiments performed according to some embodiments of the present invention.

The results of these two sets of experiments are summarized in Tables 2 and 3 and FIG. 3.

TABLE 2

| High Printing Speed | | | |
|---|---|---|---|
| Delay time [seconds] | Deformation mm 23 cm | total printing time [min] | time factor |
| 0 | 10.5 | 33 | 1.0 |
| 10 | 7.5 | 75 | 2.3 |
| 12 | 6.5 | 91 | 2.8 |
| 15 | 6 | 108 | 3.3 |
| 18 | 5 | 129 | 3.9 |
| 20 | 5 | 142 | 4.3 |
| 23 | 5 | 161 | 4.9 |
| 28 | 5 | 192 | 5.8 |

TABLE 3

| High Quality Mode | | | |
|---|---|---|---|
| Delay time [seconds] | Deformation mm 23 cm | total printing time [min] | time factor |
| 0 | 6.5 | 58 | 1.0 |
| 8 | 5 | 114 | 2.0 |

TABLE 3-continued

High Quality Mode

| Delay time [seconds] | Deformation mm 23 cm | total printing time [min] | time factor |
|---|---|---|---|
| 11 | 5 | 147 | 2.5 |
| 13 | 4 | 178 | 3.1 |
| 15 | 4 | 197 | 3.4 |
| 16 | 3.25 | 211 | 3.6 |
| 17 | 3.25 | 225 | 3.9 |
| 18 | 3.25 | 238 | 4.1 |
| 20 | 3.25 | 259 | 4.5 |
| 23 | 3.25 | 301 | 5.2 |
| 28 | 3.25 | 364 | 6.3 |

Tables 2 and 3, and FIG. 3 demonstrate that employing a delay time between successive layer formations significantly reduces the curling effect. In the present example, the minimal delay time for achieving maximal reduction was 18 seconds for the high speed mode, and 16 seconds for the high quality mode. These minimal delay times prolonged the overall printing time by factors of about 3.9 and about 3.6, respectively.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for additive manufacturing of a three-dimensional object, comprising;
   a dispensing unit configured for dispensing by inkjet technology at least one type of uncured building material;
   a curing unit configured for curing said uncured building material; and
   a controller configured for operating said dispensing unit and said curing unit to sequentially form a plurality of layers in a configured pattern corresponding to the shape of the three-dimensional object, such that for at least one layer of said layers, said curing is initiated at least t seconds after commencement of curing of a layer immediately preceding said at least one layer, wherein said t is longer than an overall time inclusive of both said dispensing and said curing of said at least one layer of said layers, and wherein for any layer of said at least one layer, there is a delay between a time at which said layer is dispensed and a time at which said curing of said layer begins,
   wherein said controller is configured to receive characteristic heat deflection temperature (HDT) data of said at least one cured building material, and to select a value of said t responsively to said HDT.

2. The system according to claim 1, wherein said t is at least 6.

3. The system according to claim 1, wherein said t is from about 10 seconds to about 25 seconds.

4. The system according to claim 1, wherein said controller is configured to select a value of said t based on a type of said at least one building material.

5. The system according to claim 1, wherein said controller is configured to select a value of said t based on energy dose delivered to said at least one layer during said curing.

6. The system according to claim 1, wherein said controller is configured to select a value of said t based a thickness of said at least one layer.

7. The system according to claim 1, wherein said controller is configured to select a value of said t based on a rate characterizing said dispensing of said at least one layer.

8. The system according to claim 1, wherein said controller is configured to select a value of said t based on an operational temperature of said formation.

9. The system according to claim 1, wherein said building material comprises at least 30% by weight of a mono acrylic or mono methacrylic functional monomer, and a respective polymer of said monomer has a glass transition temperature (Tg) higher than 50° C.

10. The system according to claim 1, wherein a characteristic heat deflection temperature (HDT) of said at least one cured building material is higher than a temperature of said cured layers.

11. A method of additive manufacturing of a three-dimensional object, the method comprising operating a system for additive manufacturing of a three-dimensional object, wherein the system comprises:
   a dispensing unit configured for dispensing by inkjet technology at least one type of uncured building material; a curing unit configured for curing said uncured building material; and
   a controller configured for operating said dispensing unit and said curing unit to sequentially form a plurality of layers in a configured pattern corresponding to the shape of the three-dimensional object, such that for at least one layer of said layers, said curing is initiated at least t seconds after commencement of curing of a layer immediately preceding said at least one layer, wherein said t is longer than an overall time inclusive of both said dispensing and said curing of said at least one layer of said layers, and wherein for any layer of said at least one layer, there is a delay between a time at which said layer is dispensed and a time at which said curing of said layer begins,
   wherein said controller is configured to receive characteristic heat deflection temperature (HDT) data of said at least one cured building material, and to select a value of said t responsively to said HDT.

12. The method according to claim 1, wherein said t is at least 6.

13. The method according to claim 1, wherein said t is from about 10 seconds to about 25 seconds.

14. The method according to claim 1, further comprising selecting a value of said t based on a type of said at least one building material.

15. The method according to claim 1, further comprising selecting a value of said t based on energy dose delivered to said at least one layer during said curing.

16. The method according to claim 1, further comprising selecting a value of said t based a thickness of said at least one layer.

17. The method according to claim 1, further comprising selecting a value of said t based on a rate characterizing said dispensing of said at least one layer.

18. The method according to claim 1, wherein a characteristic heat deflection temperature (HDT) of said at least one cured building material is higher than a temperature of said cured layers.

19. The method according to claim 18, wherein said characteristic HDT is at least 50° C.

20. The method according to claim 1, wherein said building material comprises at least 30% by weight of a mono acrylic or mono methacrylic functional monomer, and a respective polymer of said monomer has a glass transition temperature (Tg) higher than 50° C.

21. The method according to claim 20, wherein said Tg is higher than 60° C.

22. The method according to claim 20, wherein said Tg is higher than 70° C.

23. The method according to claim 1, further comprising selecting a value of said t based on an operational temperature during said formation.

* * * * *